United States Patent
Ho et al.

(10) Patent No.: US 8,744,910 B2
(45) Date of Patent: *Jun. 3, 2014

(54) PARCEL ADVERTISING SYSTEM AND METHOD

(75) Inventors: James Chen-Haw Ho, Long Beach, CA (US); Todd Avery Outten, Santa Monica, CA (US)

(73) Assignee: Zadspace, Inc., Norwalk, CT (US)

( * ) Notice: Subject to any disclaimer, the term of this patent is extended or adjusted under 35 U.S.C. 154(b) by 762 days.

This patent is subject to a terminal disclaimer.

(21) Appl. No.: 11/461,622

(22) Filed: Aug. 1, 2006

(65) Prior Publication Data

US 2008/0010137 A1     Jan. 10, 2008

Related U.S. Application Data

(63) Continuation of application No. 11/423,692, filed on Jun. 12, 2006.

(51) Int. Cl.
    *G06Q 30/00*     (2012.01)
(52) U.S. Cl.
    USPC ............... 705/14.53; 705/14.49; 705/14.66; 705/14.67
(58) Field of Classification Search
    CPC .......... G06Q 30/0251; G06Q 30/0255; G06Q 30/0269; G06Q 30/0271
    USPC ................... 705/14.53, 14.49, 14.66, 14.67
    See application file for complete search history.

(56) References Cited

U.S. PATENT DOCUMENTS

| | | | |
|---|---|---|---|
| 6,327,574 B1 * | 12/2001 | Kramer et al. | 705/14.66 |
| 7,974,875 B1 * | 7/2011 | Quilici et al. | 705/14.4 |
| 2001/0025274 A1 * | 9/2001 | Zehr et al. | 705/402 |
| 2006/0064312 A1 * | 3/2006 | Chandaria | 705/1 |

OTHER PUBLICATIONS

Swope, Christopher. Minn. drivers: You've got mail—and more. Oct. 2001. Governing. vol. 15, Iss. 1, p. 58.*
Weber, Harry R. Shippers see smooth holiday deliveries. Nov. 29, 2003. Tulsa World. Final Home Edition. p. E.3.*

* cited by examiner

*Primary Examiner* — Raquel Alvarez
(74) *Attorney, Agent, or Firm* — Steptoe & Johnson LLP

(57) ABSTRACT

A method and system provides a targeted advertisement on a package to be delivered to a recipient. The advertisement is specifically directed towards the recipient of the package. Advertisement information is received from an advertiser that includes one or more advertisements that the advertiser desires to be placed. The advertisement information is associated with advertisement selection criteria. A request for a package to be delivered to the recipient is received. The package has one or more package characteristics, and the recipient has one or more recipient characteristics including at least one location characteristic. The advertisement selection criteria associated with an advertisement are analyzed in conjunction with the package characteristics and recipient characteristics associated with the package and its recipient. An advertisement for the package is either selected or created in response to the analyzing of the advertisement selection criteria, package characteristics, and recipient characteristics. The advertisement is then placed on the package for delivery.

19 Claims, 10 Drawing Sheets

High Level Component Diagram

Promotional Placement on Package

Flow Diagram

Figure 5:
Sample Promotional Label Types
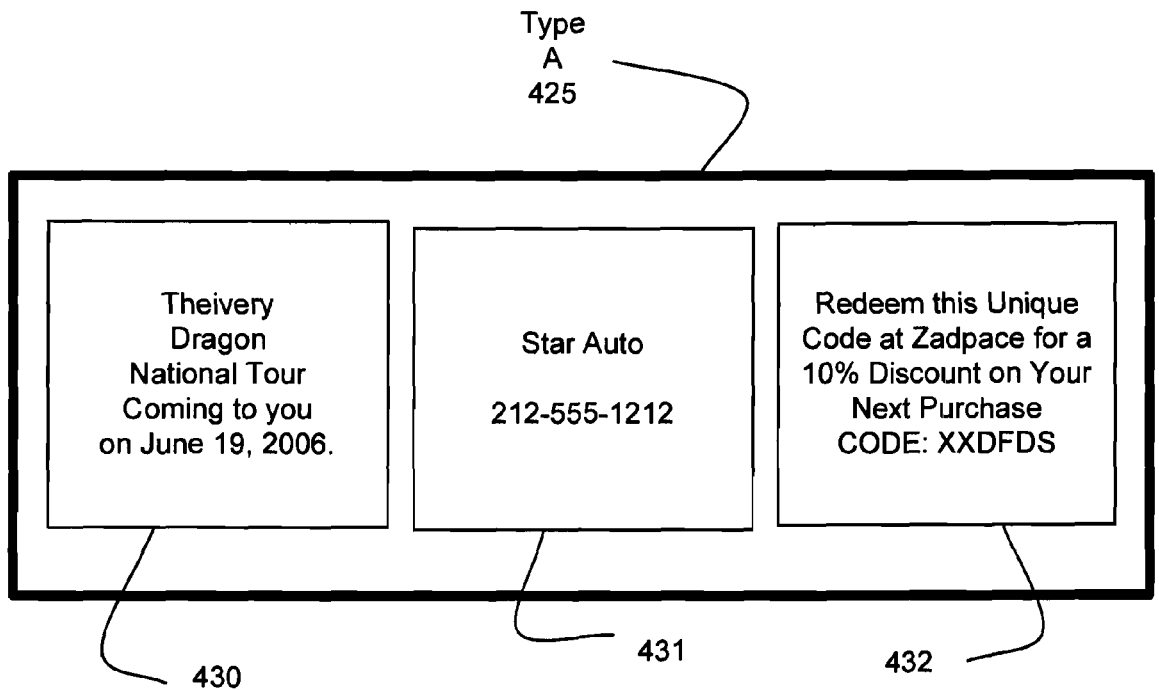
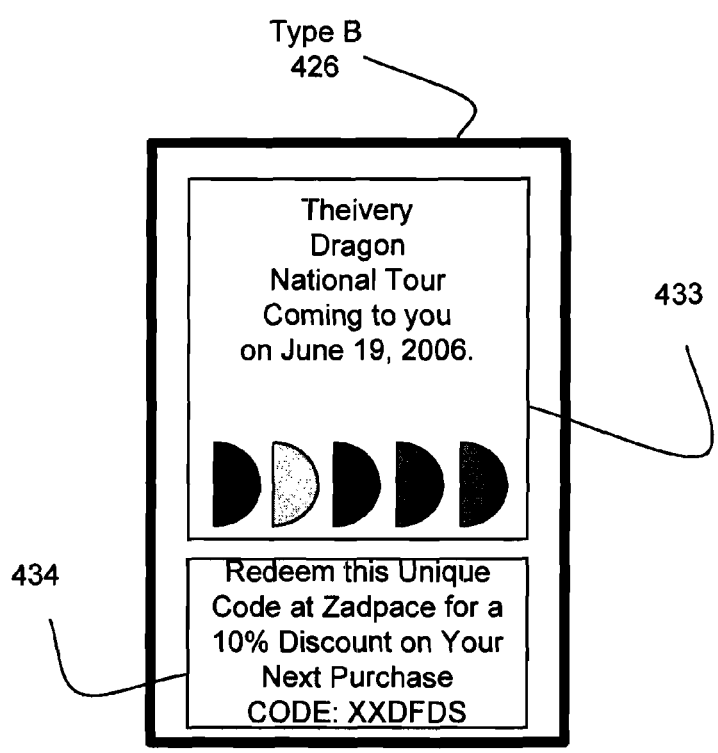

Process Flow

Determine Characteristics of Package

Determine Promotions Valid for Request

Select Promotions

Select Promotions
(continuation)

PARCEL ADVERTISING SYSTEM AND METHOD

RELATED APPLICATIONS

This application is a continuation of U.S. patent application Ser. No. 11/423,692 filed Jun. 12, 2006, entitled PARCEL ADVERTISING SYSTEM AND METHOD, which is hereby incorporated herein by reference.

FIELD OF THE INVENTION

This invention relates generally to a system and method that utilizes an outer surface of a package for placement of advertisements intended for the recipient(s) of the package, and more particularly, to a system and method that effectively selects, targets, and dispenses advertisements or other displayable materials for placement on the surface of a package.

BACKGROUND OF THE INVENTION

In business today, advertisers create and disseminate promotions, advertisements, and/or other materials to convey information about various goods or services with which they are associated. Such goods or services include products, companies, brands, public services, events, and causes. Additionally, advertisements and/or promotions may contain information in the form of incentives to influence the behavior of the person or entity viewing the promotion. For example, a coupon, which provides a discount for the purchase of an item, may influence a consumer to purchase the item.

Advertisers use promotions or other advertisements for a variety of reasons, including by way of example only, and not by way of limitation: (1) building awareness of a product or service that is being promoted; (2) providing information to persons or entities considering a purchase; (3) developing a preference for the product or service that the advertiser is promoting in a person or entity; (4) developing incentives for a person or entity to encourage them to make a purchase or engage in a service; and/or (5) building loyalty in a person or entity for what the advertisement is promoting.

Advertisers place promotions or other advertisement in locations where they are viewed (and hopefully absorbed) by other persons or entities. These locations can be both physical and/or virtual (i.e., off-line and/or on-line). For example, and not by limitation, such locations include television, newspapers, magazines, and the Internet. These advertisements or promotions can be directed regionally, according to cities, counties, states, or countries in which they are placed.

Additionally, a wide variety of different mediums may be utilized for advertising. In this sense, the medium is defined as the form in which the advertisement or promotion appears or is rendered. For example, and not by way of limitation, selected mediums can include: a printed page, a television commercial, a web site, a computer file, a computer image, a computer display, a magazine page, a billboard, or a mailing. Advertisers choose specific mediums and locations for the placement of their advertisements in order to attempt to expose the advertisement to an intended audience. For example, a marketer of female cosmetics may choose to build awareness for a new line of female cosmetics by placing an advertisement in a magazine that has a large readership of females.

Frequently, advertisers desire to target their promotions to the specific demographics of users. For example, and not by way of limitation, targeted demographic selections can include: gender, household income, age, geographic region, or language. Additionally, some advertisers desire to further target their promotions to specific individuals who meet particular criteria. In this regard, "targeting" is a technique that advertisers use to attempt to increase the effectiveness of an advertisement. Targeting allows advertisements to be directed or focused towards specific individuals or groups who are likely to be interested in, or influenced by, the advertisement. Through the use of targeted advertising, an advertiser can hopefully reduce the expense of disseminating advertisements to uninterested parties. In this manner, the overall effectiveness and efficiency of an advertising campaign can be increased due to the reduction in cost from decreased dissemination of advertisements to uninterested parties.

Various methods of advertising and/or promoting have associated advantages and drawbacks. Thus, advertisers are often inclined to pay professional advertising organizations, entities, and individuals to target and dispense their advertisements, as they seek more effective mediums, locations, and techniques for targeting, placing, and measuring the effectiveness of promotions. The advertisements and/or promotions that are suggested or used by these entities typically include expensive media or printed materials that have high distribution costs associated with them. Even Internet-based promotions, which tend to be quite efficient, still have high costs associated with them, since popular web sites often charge a premium on a per-impression basis for placing banners or links on their web pages. Further, while Internet use has increased, it is desirable to provide a form of promotional advertisement that is more readily viewed by the consuming public without having to log on to a computer.

To date, no completely satisfactory targeted marketing technique has been universally accepted and adopted. As such, advertising and marketing personnel are constantly seeking out new approaches for desirable targeted marketing. Accordingly, those skilled in the art have long recognized the need for a system and method to provide a form of targeted promotional advertisement that is readily viewed by a profiled portion of the public. This invention clearly addresses these and other needs.

BRIEF SUMMARY OF THE INVENTION

Briefly, and in general terms, the claimed invention resolves the above and other problems by providing a method for determining a targeted advertisement for a package, wherein the advertisement is specifically directed towards a recipient to whom to the package is being delivered. The method includes: receiving advertisement information including one or more advertisements that are desired to be placed, wherein the advertisement information is associated with advertisement selection criteria; receiving a request for a package to be delivered to the recipient, wherein the package has one or more package characteristics, and wherein the recipient has one or more recipient characteristics including at least one location characteristic; analyzing the advertisement selection criteria associated with an advertisement in conjunction with analyzing the package characteristics and recipient characteristics associated with the package and its recipient; selecting an advertisement for the package in response to the analyzing of the advertisement selection criteria, package characteristics, and recipient characteristics; and placing the selected advertisement on the package for delivery.

In one aspect of a preferred method, the selection of an advertisement for the package includes selecting an advertisement from a plurality of available advertisements. In another aspect of a preferred method, the placing of the selected advertisement on the package includes placing the selected advertisement adjacent to postage on the package. In another aspect of a preferred method, the placing of the selected advertisement on the package includes placing the selected advertisement adjacent to postage on a postage label that is affixed to the package.

In one embodiment of the parcel advertising system and method, the one or more location characteristics include a destination zip code for the package. Preferably, the one or more recipient characteristics include a gender of the recipient. In another aspect of a preferred embodiment, the one or more recipient characteristics include an age of the recipient. Preferably, the one or more package characteristics include the contents of the package. In one embodiment, the one or more recipient characteristics include a buying history of the recipient.

In one aspect of a preferred method, the receiving of advertisement information including one or more advertisements comprises: receiving advertisement information including a plurality of advertisements, wherein each advertisement is stored in a database. Preferably, the method further comprises: receiving a request for advertisement to be placed on a package. In one aspect of a preferred embodiment, at least one package characteristic, recipient characteristic, or combination thereof is explicitly supplied from information provided with a package and a recipient. In another aspect of a preferred embodiment, at least one package characteristic, recipient characteristic, or combination thereof is implicitly deduced from information explicitly provided with a package and a recipient.

In accordance with another aspect of a preferred embodiment, the method includes creating an advertisement for the package from parts of the advertisement information, instead of selecting a pre-formatted advertisement.

In accordance with another aspect of a preferred embodiment, the method includes: analyzing the advertisement selection criteria associated with an advertisement in conjunction with analyzing the package characteristics and recipient characteristics associated with the package and its recipient; determining a relevancy ranking for the advertisements using at least the advertisement selection criteria, package characteristics, and recipient characteristics, wherein at least one of the advertisements has a highest ranking; and placing an advertisement on the package for delivery to the recipient using at least the relevancy ranking.

In such a preferred method, the selection between two or more advertisements with the highest ranking is performed by using an auction bid associated with each advertisement. Continuing, in such as embodiment, the analyzing of the advertisement selection criteria, package characteristics, and recipient characteristics, is performed using weighted measurements to analyze the advertisement selection criteria, the package characteristics, and recipient characteristics.

In accordance with another preferred embodiment, a parcel advertising system provides a targeted advertisement on a package, wherein the advertisement is specifically directed towards a recipient to whom to the package is being delivered. The parcel advertising system comprises a computer system that includes at least one processor and at least one datastore. The computer system further includes: means for receiving advertisement information including one or more advertisements that are desired to be placed, wherein the advertisement information is associated with advertisement selection criteria; means for receiving a request for a package to be delivered to the recipient, wherein the package has one or more package characteristics, and wherein the recipient has one or more recipient characteristics including at least one location characteristic; means for analyzing the advertisement selection criteria associated with an advertisement in conjunction with analyzing the package characteristics and recipient characteristics associated with the package and its recipient; and means for selecting an advertisement for the package in response to the analyzing of the advertisement selection criteria, package characteristics, and recipient characteristics.

According to another preferred embodiment, a method is for providing a targeted message on a package to be delivered to a recipient. The method comprises receiving a message placement request, the message placement request having one or more message characteristics; selecting a package to be delivered to the recipient, the package having one or more package characteristics, and the recipient having one or more location characteristics; analyzing the message characteristics, the package characteristics, and location characteristics to determine a message for the package; and placing the determined message on the package for delivery.

In yet another preferred embodiment, a method is for subsidizing shipping costs for a package by selecting a targeted promotional label for placement on the package to be delivered to a recipient, the package having one or more characteristics, the recipient having location characteristics. The method includes receiving a plurality of promotional requests, each promotional request having one or more promotional characteristics, wherein for each promotional request, one of the promotional characteristics includes a bid price offered to place a promotion on the package; analyzing the promotional characteristics, the package characteristics, and location characteristics to determine a relevancy ranking for the promotional requests, at least one of the promotional requests having a highest ranking; for each of the at least one highest ranked promotional requests, placing the promotion for which the bid price that is offered on the package for delivery; and recovering shipping costs for the package by receiving the bid price offered for each of the at least one highest ranked promotional requests.

BRIEF DESCRIPTION OF THE DRAWING

FIG. 5 illustrates a top view of several examples of promotional label types in accordance with one preferred embodiment;

DETAILED DESCRIPTION OF THE PREFERRED EMBODIMENTS

Figure 1:
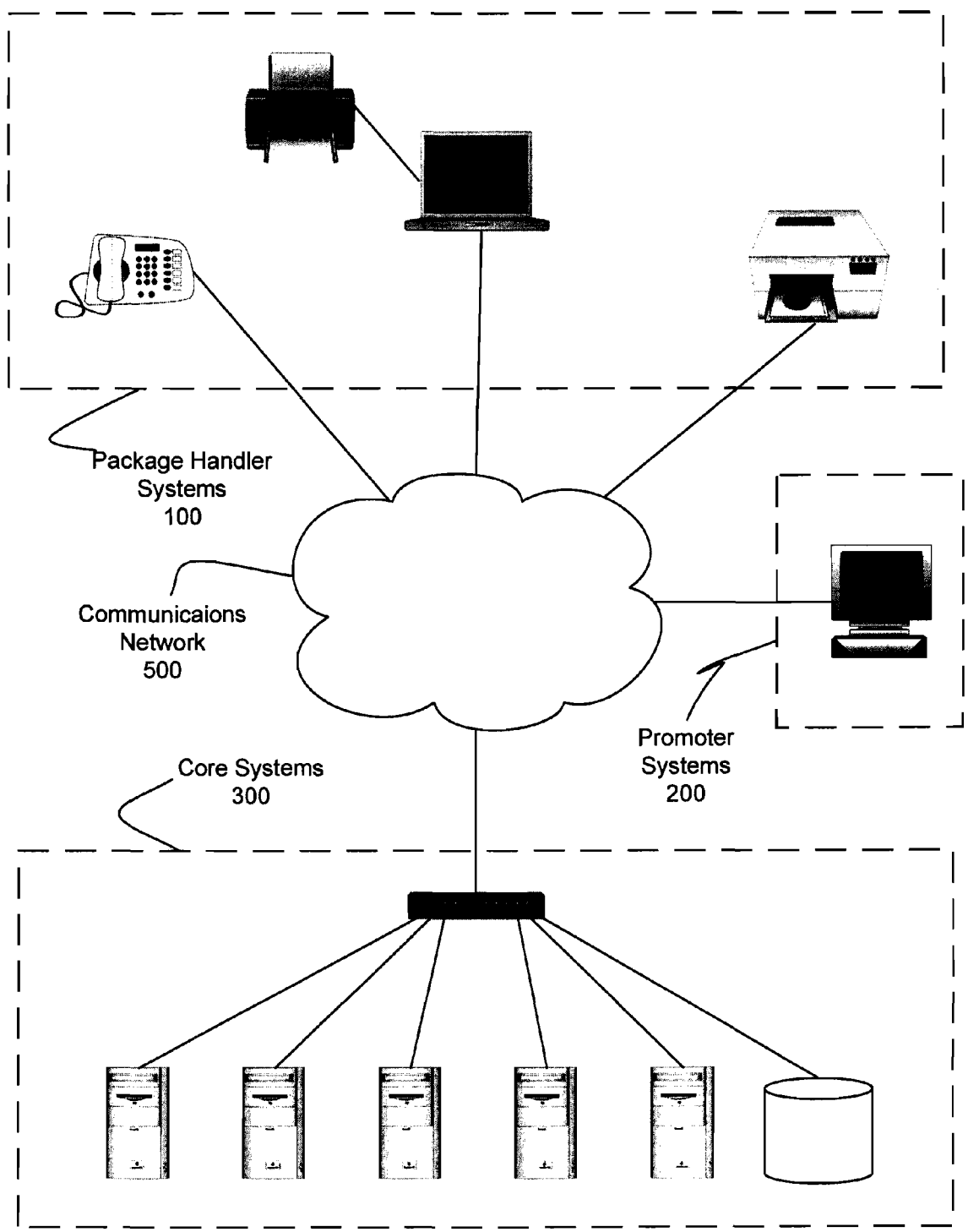
FIG. 1 illustrates a component diagram of a system for providing targeted advertising on delivered parcels/packages, in accordance with one preferred embodiment.

A preferred embodiment of a parcel targeted-advertising system, constructed in accordance with the invention, enables an advertisement or other displayable materials to be selected, targeted, and dispensed onto an outer surface of a parcel or package, preferably on a portion of a postage label. In this manner, advertisers can effectively target appropriate advertisements to the recipients of ordered parcels/packages using available space on the parcel's outer surface, which may include a portion of a postage label. The advertisements and/or promotions are created, selected, or otherwise determined using parameters that have been provided by, or deduced from, the recipients of ordered parcels/packages, including by way of example only, and not by way of limitation, characteristics deducible from order product and the location of the recipient (e.g., zip code). Referring now to the drawings, wherein like reference numerals denote like or corresponding parts throughout the drawings and, more particularly, to FIGS. 1-9B, there is shown one embodiment of a parcel targeted-advertising system 10 in accordance with the invention.

Referring now to FIG. 1, a parcel targeted-advertising system 10 is shown that includes several components for enabling the selecting, targeting, and dispensing of advertising labels on their associated parcels. The preferred embodiment of the parcel targeted-advertising system 10 shown in FIG. 1 includes a package handler system 100, a communications network 500, a core computer system 300, and a advertiser/promoter system 200. In one preferred embodiment, an advertiser uses a networked computer system 200 to create and transmit information about their advertisements and/or promotions to core computer systems 300 via the communications network 500. In other embodiments, advertisers transfer information about their advertisements to the core computer systems 300 of the parcel targeted-advertising system 10 without the use of the advertiser/promoter system 200 and/or the communications network 500. Additionally, package handlers use their computer systems 100 to request advertisements and/or promotions from the core computer systems 300 of the parcel targeted-advertising system 10 (preferably, via the communications network 500) for placement on the parcel/package.

Figure 2:
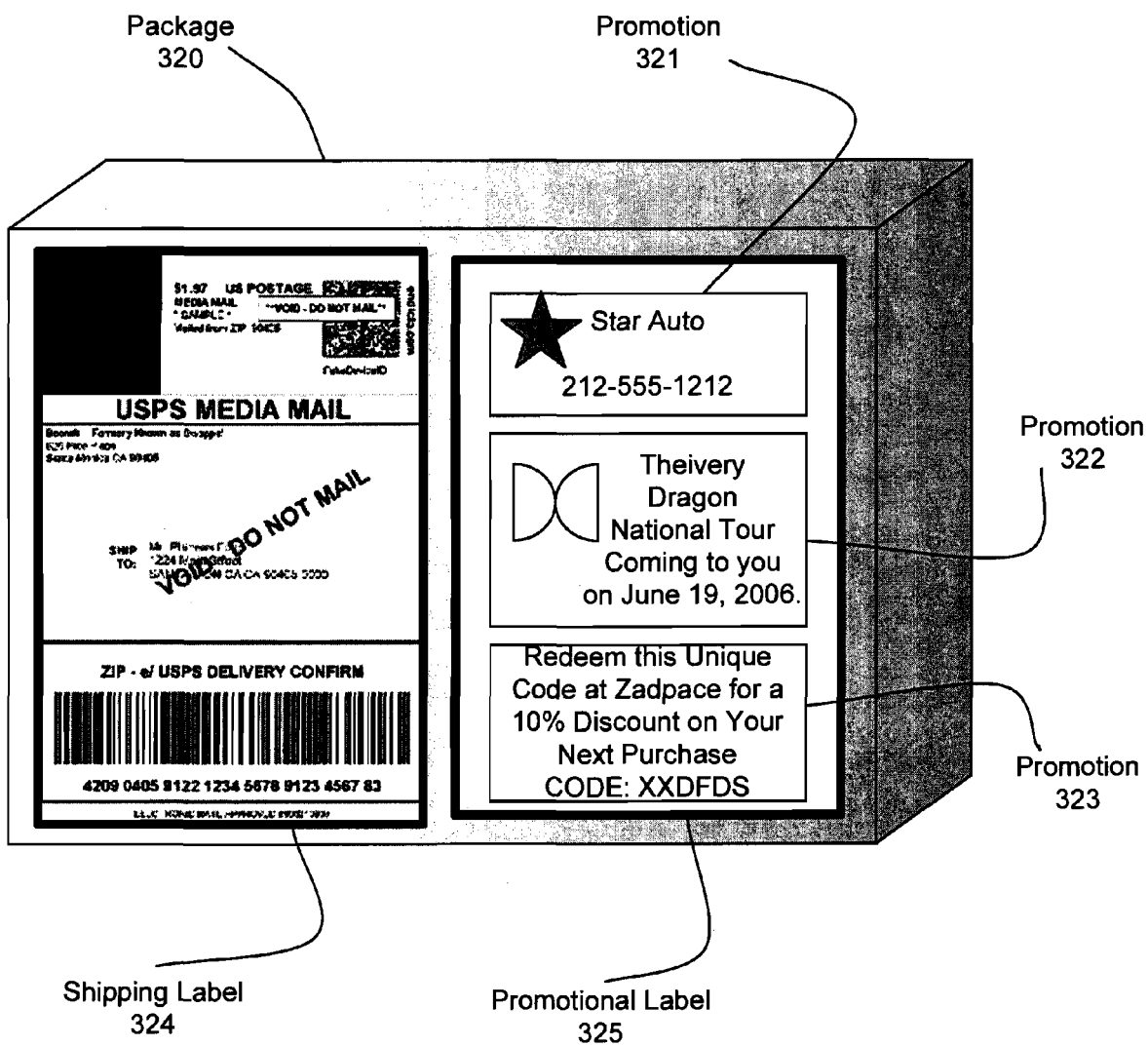
FIG. 2 illustrates a perspective view of package that has a set of advertisements on a label, in accordance with one preferred embodiment of the parcel targeted advertising system.

The core computer systems 300 then creates, selects, or otherwise determines the appropriate targeted advertisements and/or promotions using parameters that have been provided by, or deduced from, the recipient information relating to the ordered parcel/package. Continuing, in this embodiment, the core systems 300 of the parcel targeted-advertising system 10 respond to package handler requests and transmit information about the advertisements and/or promotions to be placed on the package. In one such embodiment, the package handler then outputs the targeted advertisements onto a label and places the label on the associated parcel/package. In this regard, FIG. 2 illustrates a package 320 with a set of advertisements and/or promotions 321, 322, and 323 on a label 325 that is placed next to a shipping label 324.

As stated above, in the parcel targeted-advertising system 10, appropriate targeted advertisements and/or promotions utilize parameters that have been provided by, or deduced from, the recipient information relating to the ordered parcel/package. For example, and not by way of limitation, targeting specific criteria include: information regarding who purchased a specific item within a specific time frame; information regarding who lives at a specific address; information regarding who works at a specific company; or information regarding who belongs to a specific organization.

Figure 3:
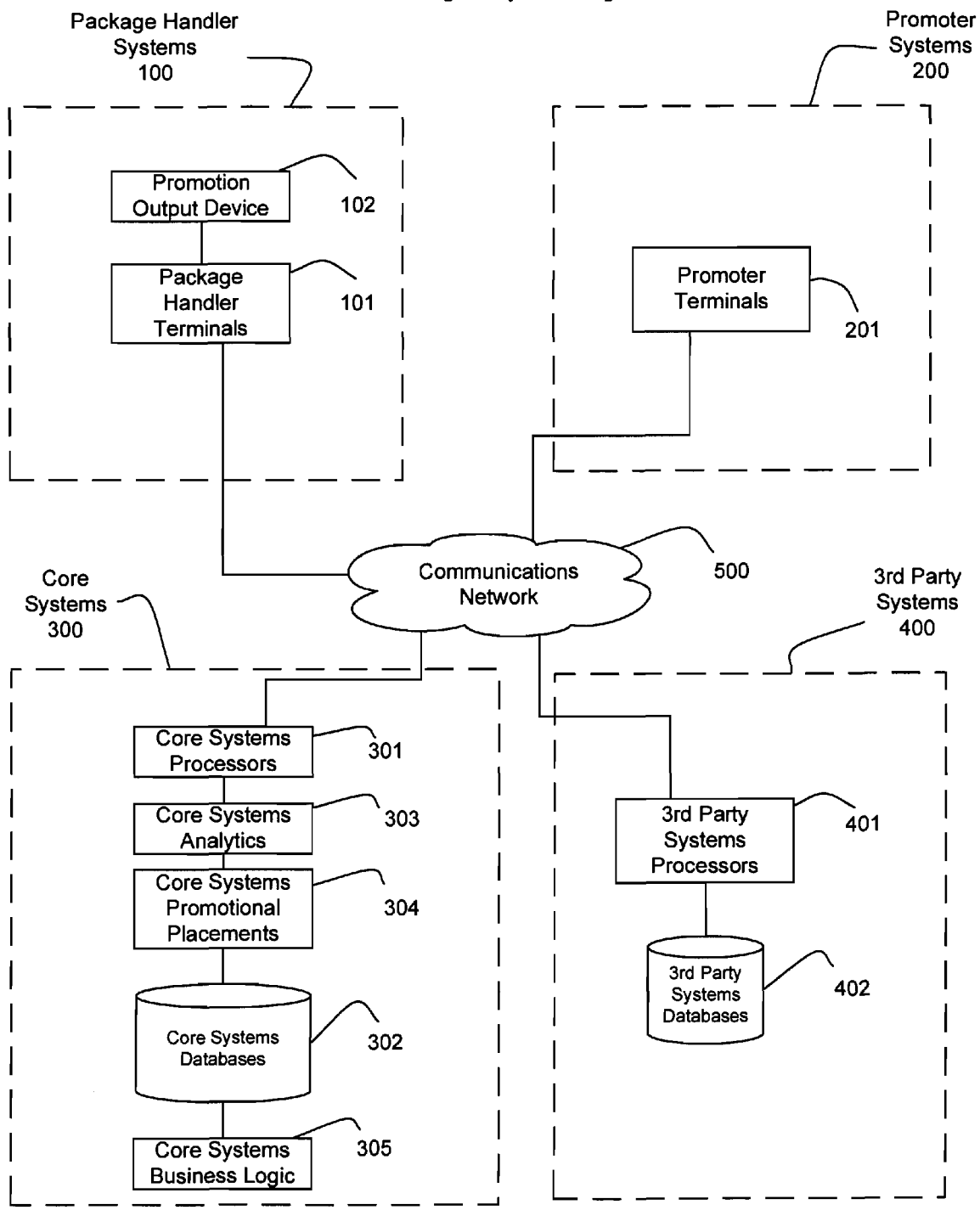
FIG. 3 illustrates a block diagram of a parcel targeted advertising system that is utilized in accordance with one preferred embodiment.

Referring now to FIG. 3, a logical system diagram is illustrated of one preferred embodiment of parcel targeted-advertising system 10. In this embodiment, the components are depicted as a distributed system. Computer systems and system components (e.g., computer systems, computer code and logic, database systems, memory storage, and the like) utilize one or more physically or logically-separated devices, computers, or terminals that interchange information over communication networks 500.

In one embodiment, the parcel targeted-advertising system 10 includes a package handler system 100, an advertiser/promoter system 200, a core system 300, a third party system 400, and a communication network 500. Contained within the systems 100, 200, 300, and 400, and network 500 are components that include, by way of example only, and not by way of limitation, terminals, processors, and memory systems that contain, store, and process information used by the system 10. Examples of the specific types of terminals, processors, and memory systems include, by way of example only, and not by way of limitation: computer systems, database systems, point-of-sale terminals, calculation devices, telephony equipment, database systems and software, random access memory, non-volatile memory, static memory, and disk systems.

In one aspect of a preferred embodiment, the parcel targeted-advertising system 10 utilizes a communication network 500 to transmit and receive information. The communication network 500 transmits information between components of the system 10. In one embodiment, the parcel targeted-advertising system 10 utilizes any combination of analog and/or digital communication protocols. For example, and not by way of limitation, communication mediums include: analog and/or digital telephony lines, wired and/or wireless networks, computer networks of any kind, and/or cellular (or other mobile telephone spectrum) networks.

In one aspect of a preferred embodiment, advertisers use the advertiser/promoter systems 200 to create, transmit, and access information about advertisements and/or promotions they wish to sponsor. Using an advertiser/promoter system 200, the advertiser defines the nature, contents, and characteristics of the advertisements ("advertisement information"), which is then transmitted as advertisement data to the core systems processors 301, which store the promotion data in the core systems databases 302. The core systems processors 301 analyze the advertisement information stored within the core systems databases 302 to determine selection criteria associated with advertisement. The analysis produces an inventory of advertisements ("advertisement inventory"), along with advertisement information for each advertisement. In some embodiments of the parcel targeted-advertising system 10, other components (i.e., core systems analytics 303 and core systems advertisement and/or promotional placements 304) are also utilized during this process.

In another aspect of a preferred embodiment, package handlers use package handler systems 100 to request advertisements (and/or promotions) for placement on a package. In one preferred embodiment of the parcel targeted-advertising system 10, package handler systems 100 include package handler terminals 101 and one or more advertisement and/or promotional output devices 102. The package handler terminals 101 transmit information about the nature, contents, and characteristics of a package ("package information") to the core systems 300. In one embodiment, the package handler terminals 101 are used to request advertisements and/or promotions ("advertisements and/or promotional request") for placement on the package. In another aspect of a preferred embodiment, one or more advertising and/or promotional output devices 102 are then used to place the selected (or created) advertisements on their associated package. In one preferred embodiment, the package handler systems 100 include postage placement personnel.

In a preferred embodiment of the parcel targeted-advertising system 10, the core system processors 301 receive, analyze, and return advertising and/or promotional requests. As mentioned above, in one embodiment, the most suitable advertisements for a given package are identified using core systems analytics 303 and core systems advertising and/or promotional placements 304, as well as (optionally) third party processors 401 and third party databases 402. Due to the benefit in targeted advertising, advertisers and other third parties (using third party processors 401 and third party databases 402) have begun or increased their collection and analysis of market information (e.g., sales data, census data, demographics, and retail purchases) to assist in targeted advertising campaigns to individuals or groups. Through various quantitative and qualitative techniques (e.g., data mining, predictive and trend analysis, consumer behavioral modeling, consumer interviews), these advertisers can develop models and profiles that assist in the development, placement, and content of an advertisement.

These components (core systems analytics 303 and core systems advertising and/or promotional placements 304, as well as optionally third party processors 401 and third party databases 402) use the parameters issued by the package handler systems 100 in conjunction with the core systems databases 302 to identify (or create) a set of eligible advertisements and/or promotions. In another aspect of a preferred embodiment, core systems business logic 305 further refines the results until a set of advertisements and/or promotions customized to the nature, contents, and characteristics of the advertisement and/or promotional request is identified (from a list or matrix) or created (using advertisement generation formulas or rules). The package handler terminals 101 receive the customized advertisement and/or promotion set as a reply to the previously issued advertisement and/or promotional request. As described above, the advertisement set is then applied to the package by the advertising and/or promotion output device 102 utilizing an appropriate medium.

In one preferred embodiment, the parcel targeted-advertising system 10 implements a business rule to determine (or certify) the cost effectiveness of dispensing the advertisement and/or promotion. Preferably, this occurs after the advertisement and/or promotion has been selected (or created), but before the advertisement and/or promotion has been placed on the parcel. Specifically, once the advertisement and/or promotion has been generated, the parcel targeted-advertising system 10 looks at the total revenue that the particular advertising and/or promotion represents (i.e. the sum total cost of the individual advertisement and/or promotion placements). If the total revenue is below some threshold, the parcel targeted-advertising system 10 will not dispense the advertisement and/or promotion. The purpose of this rule is to enable one or more of the systems (e.g., either the core system 300, the package handler system 100, the advertiser/promoter system 200, and/or the third party system 400) to determine if the advertisement and/or promotion is economically viable. Otherwise stated, this rule determines whether the revenue generated from the dispensing of the advertisement and/or promotion justifies the costs associated with the dispensing of the advertisement and/or promotion (e.g., labor, printing, paper, and the like).

Figure 4:
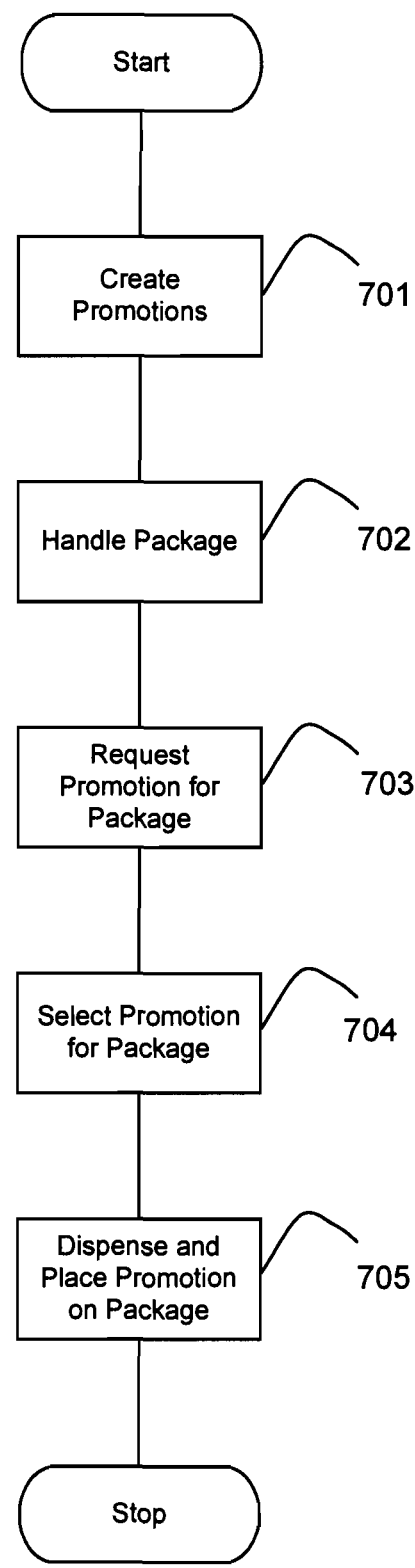
FIG. 4 illustrates a process flow diagram of a parcel targeted advertising method in accordance with one preferred embodiment.

Referring now to FIG. 4, a process flow diagram is illustrated of one preferred embodiment of a parcel targeted-advertising method. First, promotions (advertisements, or components thereof) are created by an advertiser, Step 701. At Step 702, package handlers handle a package. At Step 703, requested advertisements and/or promotions are to be placed on the package. At Step 704, promotions (and/or advertisements) are selected by analyzing the nature, contents, and characteristics of the package and the available advertisements and/or promotions. In another preferred embodiment, the advertisements and/or promotions are created from advertisement and/or promotions subcomponents used by analyzing the nature, contents, and characteristics of the package and available advertisements and/or promotions. Finally, the selected advertisements and/or promotions are dispensed and placed on the package, Step 705.

By way of example only, and not by way of limitation, in one preferred embodiment of the parcel targeted-advertising system 10 in operation, an advertiser (or promoter) wishes to build awareness for an upcoming event in the Los Angeles area. As the event relates to health and beauty products for women, the promoter further desires to direct their advertisements and promotional materials towards individuals who are purchasing and/or receiving cosmetic goods.

In furtherance of this objective, on Sep. 15, 2007, the promoter creates a promotion (Step, 701 in FIG. 4) on a computer system 201 (FIG. 3). The promotion contains a text message, "The Largest Health and Beauty Show in Los Angeles is coming Jan. 30, 2008." Additionally, the promoter includes an image with the promotion. The promoter defines additional characteristics for the promotion, including, by way of example, and not by way of limitation: valid dates of Nov. 1, 2007 through Dec. 31, 2007, and a valid region of all postal codes within 100 miles of the Los Angeles postal code 90034. Referring again to FIG. 3, in this non-limiting example, the promoter transmits the information about the promotion from the computer 201 to the core systems processors 301 over the Internet 500 on Sep. 16, 2007.

Continuing, in this non-limiting illustrative example, a package handler processes a package on Nov. 14, 2007 (Step 702 in FIG. 4) that contains cosmetic goods and is being shipped to a postal code within 100 miles of the Los Angeles postal code 90034. Additionally, the package is due to be shipped on Nov. 16, 2006. In one preferred embodiment, the package handler desires to place one or more advertisements and/or promotions on the surface of the package, due to financial considerations or other compensation provided to the package handler. In another preferred embodiment, the other parties (e.g., the advertisers, operators of the core systems, package recipients, or combinations thereof, and the like) may be the ones that desire one or more advertisements and/or promotions to be placed on the surface of the package, due to financial considerations or other compensation. Using the package handler's computer system 101, a request is made (Step 703 in FIG. 4) to the core systems 300 for one or more advertisements and/or promotions. In one specific, non-limiting embodiment, the request is transmitted via an analog modem over an analog phone line 500 from the package handler's computer system 101 to the core systems 300. In other preferred embodiments, various other types of transmission devices may be used that utilize various other mediums of transmission, as well as numerous different categories of communication networks 500. In some preferred embodiments, the requests, advertisement information, and/or advertisements to be placed may be delivered or otherwise transmitted without the use of a communication network 500.

In one aspect of the parcel targeted-advertising system 10, the core systems processors 301 receive the request. The request is then analyzed by the components of the core systems 300, which preferably include core systems processors 301, core systems databases 302, core systems analytics 303, core systems promotional placements 304, and core systems business logic 305. Optionally, other third party systems 400, which include third party processors 401 and third party databases 402, analyze the request. This analysis determines that a promotion exists that can satisfy the request and selects this promotion (step 704 in FIG. 4) for the package handler's request. Alternatively, this analysis determines that a promotion can be created that can satisfy the request, and it creates this promotion. In this non-limiting illustrative example of a parcel targeted-advertising system 10, the core systems processors 301 then respond to the package handler terminals 101 with the promotion for the upcoming event in Los Angeles.

At this point, the parcel targeted-advertising system 10 determines (or certifies) the cost effectiveness of dispensing the advertisement and/or promotion. Preferably, this occurs after the advertisement and/or promotion has been selected (or created), but before the advertisement and/or promotion has been placed on the parcel. Specifically, once the advertising and/or promotion has been generated, the parcel targeted-advertising system 10 looks at the total revenue that the particular advertising and/or promotion represents (i.e. the sum total cost of the individual advertisement and/or promotion placements). If the total revenue is below some threshold, the parcel targeted-advertising system 10 will not dispense the advertisement and/or promotion. The purpose of this rule is to enable one or more of the systems (e.g., either the core system 300, the package handler system 100, the advertiser/promoter system 200, and/or the third party system 400) to determine if the advertisement and/or promotion is economically viable. Otherwise stated, this rule determines whether the revenue generated from the dispensing of the advertisement and/or promotion justifies the costs associated with the dispensing of the advertisement and/or promotion (e.g., labor, printing, paper, and the like).

Lastly, the package handler prints out the promotion (Step 706 in FIG. 4) on a label by way of a color printer 102 resident with the package handler computer system 101. The package handler places the label with the printed promotion on the package and ships the package to the recipient. In another preferred embodiment, the advertisement and/or promotion is placed on the outer surface of the package using other techniques, such as direct printing on the package itself instead of on a label. In one preferred embodiment of the parcel targeted-advertising system 10, the advertisement and/or promotion is placed on a previously unused portion of a postage label. In this manner, a package handler (or entity performing an equivalent function) may combine or partially combine the postage affixing process with the advertisement affixing process. Continuing, discounts or other financial compensation for placing the advertisements on their associated packages may be directly interrelated with postage costs (e.g., recipients of packages that contain advertisements may be eligible for free or reduced price shipping).

Processing an Advertisement and/or Promotional Request:

In one embodiment of a parcel targeted-advertising system 10, package handlers transmit information about the nature, contents, and characteristics of a package to the core system 300 to request advertisements or promotions for placement on the package. This information is embodied in an advertisement and/or promotional request message. The form of the promotional request is dependent on the communication medium in which the advertisement and/or promotional request is transmitted to the core system 300. For example, and not by way of limitation, forms for the promotional request include: (1) HTTP GET request for a web application that accesses the core system 300 over a digital communications network 500 such as the Internet; (2) XML/SOAP for a web services application that accesses the core system 300 over a digital communications network 500 such as the Internet; (3) facsimile for an application that accesses the core system 300 over a digital or analog telephony network 500; (4) electronic terminal that accesses the core system 300 over a digital or analog telephony network 500 (e.g., a device for entering a postal code for printing a label having a credit card processing machine); (5) human voice over a digital or analog telephony network 500 for an operator that accesses the core system 300 through a human-assisted or automated telephony application.

In one embodiment, by way of example, and not by way of limitation, the promotional request contains the following information: (1) postal code and country (collectively, "postal code") of the recipient of the package; and (2) promotional label type, which identifies a document template used to determine the number and type of promotions applicable for this request; for example, the size, shape, and color.

FIG. 5 illustrates a specific, non-limiting example of advertising label types. Label type A 425 designates a 7"×4" label that prints in black-and-white and accepts three text-based advertisement and/or promotional messages 430, 431, and 432. Preferably, each message can contain up to 100 characters. Label type B 426 designates a 4"×6" label that prints in color and accepts two advertisement and/or promotional messages 433 and 434. Advertisement and/or promotional message 433 can contain any combination of images and text and is placed in an area of 3.5"×4.25." Advertisement and/or promotional message 434 can contain any combination of images and text and is placed in an area of 3.5"×2."

Optionally, in one embodiment, the promotional request contains additional information about the nature, contents, and characteristics of the package. By way of example, and not by way of limitation, the additional information includes:

1. Date of advertisement and/or promotional placement.
2. Item or items contained within the package.
3. Cost of the item(s) contained within the package.
4. Manufacturer(s) of the item(s) contained within the package.
5. Name of the recipient.
6. Address of the recipient.
7. A minimum "bid" for the placement.
8. Nature of the transaction that resulted in the shipment (e.g., retail sale, auction, repair, and the like).
9. Demographic information of the recipient (e.g., age, gender, marital status, religion, occupation, affiliations, employment, language, education, socioeconomic status, ethnicity, employment, income, mobility, home ownership, debts, life cycles, nationality, family size, and the like).
10. Psycho-graphics of the recipient (e.g., interests, attitudes, opinions, personality trains, values, life styles, and the like).
11. Companies, causes, and other organization affiliations of the package handler or recipient.
12. Purchase history of the recipient.
13. Future shipments of the recipient.

14. Items desired by the recipient (items on the recipient's "wish list").
15. Item in the package, or items that relate to the item contained in the package.

Figure 6:
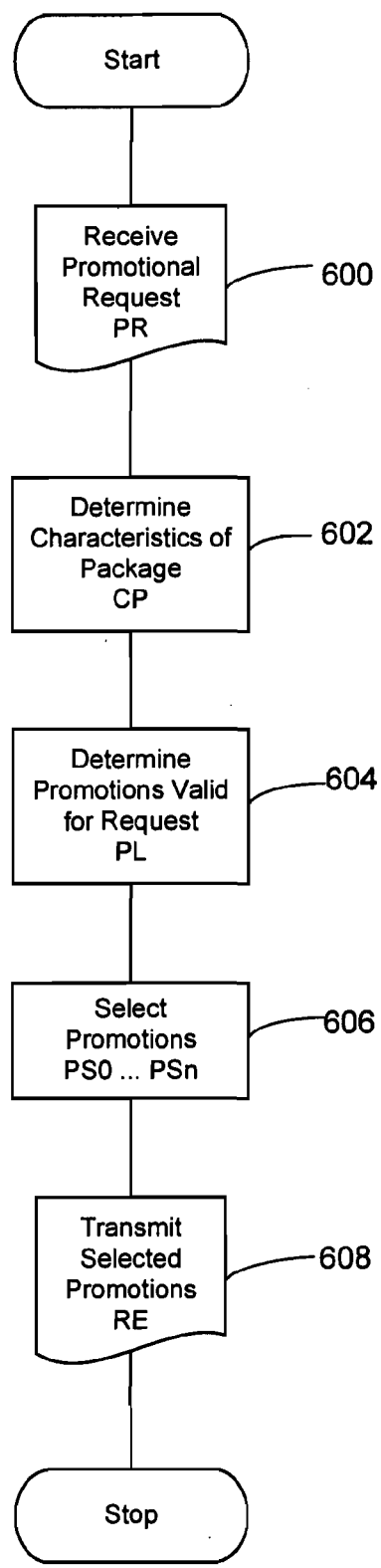
FIG. 6 illustrates a process flow diagram of a parcel targeted advertising method, in accordance with one preferred embodiment, to process a received advertising request.

Nature, Contents, and Characteristics of a Package:

Referring to FIGS. 1 and 6, a process flow diagram illustrates a method performed by the core systems 300 to process a received promotional request according to one preferred embodiment of a parcel targeted-advertising system 10. After receiving the promotional request (step 600), the core systems 300 determine the nature, contents, and characteristics (collectively referred to as "characteristics") of a package through a formulaic method. The system 300 maintains a global classification list that contains zero or more nodes. Each node represents a characteristic which is used to classify products, services, individuals, entities, demographics, psychographics, documents, locations, postal codes, and the like.

$$C=\{N_0, N_1, \ldots, N_n\}$$

where N=Node

Each node is an object that contains:
1. A nodal weight.
2. A list of zero or more keywords, each with a unique weight.
3. A list of zero or more related nodes, each with a unique weight.

Thus, $$N=NW, \{(K_0, KW_0), (K_1, KW_1), \ldots, (K_n, KW_n)\}, \{(NN_0, NNW_0), (NN_1, NNW_1), \ldots, (NN_n, NNW_n)\}$$

where NW=Nodal Weight; K=Keyword; KW=Keyword Weight; NN=Related Nodes; and NNW=United Nodal Weight In one embodiment, a characteristic filter is a named instance of the global classification list with specific values for each node. Examples of characteristic filters include: $CF_{male}$ (gender); $CF_{UPC\ 00321\text{-}321\text{-}2213}$ (UPC number); $CF_{married}$ (marital status); $CF_{ISBN\ 1\text{-}56592\text{-}001\text{-}5}$ (ISBN number); and $CF_{catholic}$ (religious affiliation).

In addition, the system 300 maintains a list of localized characteristic filters. A localized characteristic filter is a characteristic filter that is specific to a postal code, such as: $CFL_{male,90034}$ (characteristic filter for males in postal code 90034).

The system organizes characteristic filter and localized characteristic filters into characteristic classes. For example:

$$CL_{class}=\{CF_n, CF_m, CFL_{x,y}, CFL_{q,z}\}$$

where CL=Characteristic Class; CF=Characteristic Filter; and CFL=Localized Characteristic Filter Each class represents a category of relevant characteristics. For example:

$$CL_{gender}=\{CF_{male}, CF_{female}, CFL_{female,10023}, \ldots\}$$

$$CL_{marital\ status}=\{CF_{married}, CFL_{single,08034}, CF_{single}, CF_{divorced}, \ldots\}$$

$$CL_{economic\ status}=\{CF_{lower\ class,90034}, CF_{middle\ class}, CF_{upper\ class}, \ldots\}$$

$$CL_{postal\ code}=\{CF_{10024}, CF_{90034}, \ldots\}$$

$$CL_{day\text{-}of\text{-}week}=\{CF_{monday}, CFL_{tuesday,90023}, CF_{saturday}, \ldots\}$$

$$CL_{date}=\{CF_{1\text{-}2\text{-}2006}, CFL_{2\text{-}14\text{-}2006,08604}, CF_{12\text{-}25\text{-}2008}, \ldots\}$$

$$CL_{weather}=\{CF_{rain}, CF_{sunny}, CFL_{snow,10024}, \ldots\}$$

Figure 7:
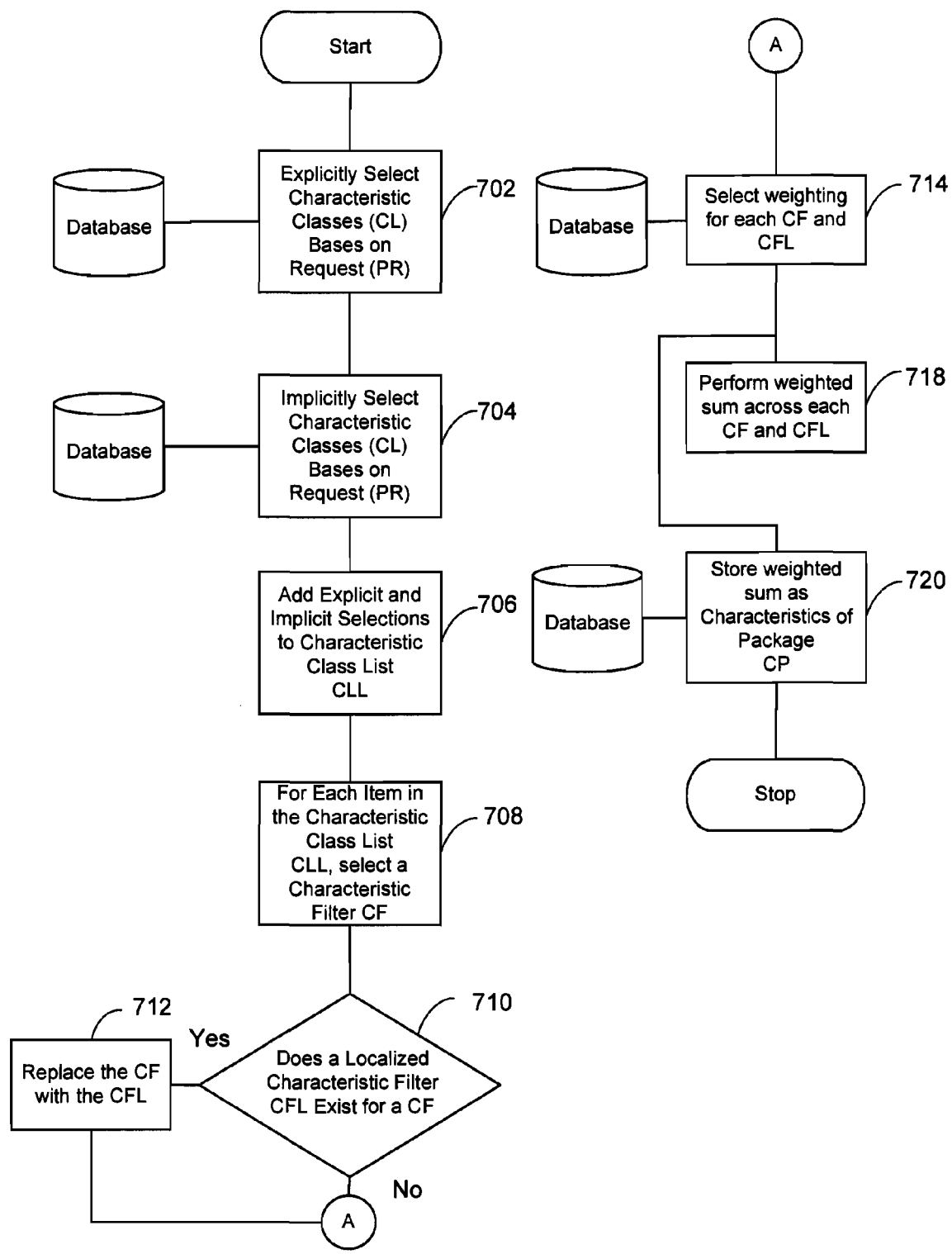
FIG. 7 illustrates a process flow diagram of a parcel targeted advertising method, in accordance with one preferred embodiment, to determine the characteristics of a parcel.

Upon receipt of a promotional request, the system 300 determines a characteristic list of characteristic classes that are applicable to the request. Referring now to FIG. 7, a preferred method is shown in which the system 300 determines (e.g., either records or deduces) the characteristics of a package. In one preferred embodiment, the system 300 selects items by determining which classes are explicitly (e.g., records provided information) (step 702) and implicitly (e.g., deduces additional information from provided information) (step 704) defined within the promotional request. The following are sample explicit and implicit definitions, which are provided by example only, and not by way of limitation:

1. Explicit: Specific information is contained within the promotional request, such as:
   a. Postal code of the recipient ($CL_{postal\ code}$).
   b. Items within the package ($CL_{product\ code(0)}$, $CL_{product\ code(1)}$).
   c. Religious affiliation of the recipient ($CL_{religion}$).
   d. Age of the recipient ($CL_{age}$).
2. Implicit: Secondary analysis of the promotional request:
   a. Gender as determined by analyzing the name of the recipient ($CL_{gender}$).
   b. Special events associated with the date that the package is expected to be delivered ($CL_{holiday}$).
   c. Socio-economic status of the postal code of the recipient ($CL_{economic\ status}$).
   d. Weather of the postal code of the recipient (by accessing systems that contain weather information) ($CL_{weather}$).

where CL=Characteristic Class

In one preferred embodiment of the parcel targeted-advertising system 10, the system 300 calculates the characteristics of a package as a weighted sum across all the characteristic filters, which are applicable to the specific promotional request. The system 300 selects zero or more characteristic filters from each characteristic class within the. In the event that a localized content filter exists for the characteristic filters, the system 300 will use the Localized Characteristic Filter; otherwise, the system uses the Characteristic Filter, as is shown by the following equation:

$$CP=(CFL_{0,y}\ or\ CF_0)*W_0+(CFL_{1,y}\ or\ CF_1)*W_1+\ldots+(CFL_{n,y}\ or\ CF_n)*W_n$$

where CP=Package Characteristics; CFL=Localized Characteristic Filter; CF=Characteristic Filter; and W=Weighted Sum Each weighted sum is multiplied by each Nodal Weight, Keyword Weight, and Unique Nodal Weight within node contained within the Characteristic List or Localized Characteristic Filter. The resultant characteristics are the characteristics of a specific package in response to a specific promotional request.

By way of example, and not by way of limitation, the following provides an illustration of use of the characteristics in processing the promotional request:

1. A promotional request is received by the system.
2. The promotional request contains the following information:
   a. Postal code—90034 USA
   b. Religion—Buddhist
   c. Name—James Barthlow
   d. Date—Feb. 28, 2006

3. At Step 706 (FIG. 7), the system 300 constructs a characteristic class list for the request.
   a. The system 300 explicitly adds the following characteristic classes to the characteristic class list:
      i) $CL_{postal\ code}$
      ii) $CL_{religion}$
      iii) $CL_{date}$
   b. The system 300 implicitly adds the following characteristic classes to the characteristic class list:
      i) $CL_{gender}$. The system 300 can determine the gender of the recipient from the first name (e.g., James).
      ii) $CL_{economic\ status}$. The system 300 can correlate the postal code with a demographic profile for economic status.
      iii) $CL_{weather}$. By accessing a third party weather database, the system 300 can determine the weather characteristics of the place represented by the postal code.
   where CL=Characteristic Class
4. The resulting characteristic class list is:
   $CLL = CL_{postal\ code}, CL_{religion}, CL_{gender}, CL_{economic\ status}, CL_{weather}$
   where CL=Characteristic Class; and CCL=Characteristic Class List;
5. At Step 708, the system 300 selects the specific characteristic filter for each item in the characteristic class list characteristic class list.
   a. For $CL_{postal\ code}$, the system 300 selects $CF_{90034}$.
   b. In step 710, for $CL_{religion}$, the system 300 attempts to locate $CF_{buddhist}$; however, such a profile does not exist in the system. The system 300 attempts to locate $CFL_{buddhist,90034}$. If such a profile does not exist in the system 300, the system is unable to select a characteristic filter CF for class "religion". Otherwise, the system 300 replaces the CF with the CL for each characteristic, Step 712.
   c. For $CL_{gender}$, the system 300 selects $CF_{male}$. The system also contains a localized characteristic filter $CFL_{male,90034}$, so the system 300 replaces $CF_{male}$ with $CFL_{male,90034}$.
   d. For $CL_{economic\ status}$, the system 300 accesses a demographic database and identifies the economic status of postal code 90034 as "middle class". The system 300 selects $CL_{middle\ class}$. A localized content filter CFL does not exist in the system 300 for this postal code and class.
   e. The weather in 90034 is "sunny" and "warm". The system 300 selects $CL_{sunny}$ and $CL_{warm}$. A localized content filter CFL exists for the "warm" class, so the system 300 replaces $CF_{warm}$ with $CFL_{warm,90034}$.
   where CL=Characteristic Class; CF=Characteristic Filer; and CFL=Localized Characteristic Filter
6. At Step 714, by way of example, and not by way of limitation, an active system configuration defines the weight of the characteristic filters as follows:

| CLASS | WEIGHT |
| --- | --- |
| gender | 1.4 |
| postal code | 3.4 |
| economic status | 0.5 |
| weather | 1.25 |

7. Further the system 300 is configured to re-adjust localized characteristic filters by a factor defined in the system configuration.

| Localized Characteristic Filter | Weight |
| --- | --- |
| gender, 90034 | 2 * gender = 2.8 |
| warm, 90034 | 2.5 * weather = 3.125 |

8. At Step 718, the characteristics of the package for this request is calculated as follows:

$$CP = (2.8) * CFL_{male,90034} + (3.4) * CF_{90034} + (0.5) * CF_{middle\ class} + (1.25) * CF_{sunny} + (3.125) * CF_{warm,90034}$$

where CP=Characteristics of a Package; CF=Characteristic Filer; and CFL=Localized Characteristic Filter At Step 720, the weighted sum is stored.

Nature, Contents, and Characteristics of Advertisements:

In one preferred embodiment of the parcel targeted-advertising system 10, the system 300 determines the nature, contents, and characteristics (collectively referred to as "characteristics") of promotions through a formulaic method, in response to a promotional request from the package handler. The system 300 maintains a database that contains information about each advertisement and/or promotion. Each advertisement and/or promotion contains: (1) a list of valid postal codes; (2) a list of valid dates; (3) a list of categories (i.e. nodes N) PNODES for which the promotion is related; (4) a placement type; (5) an auction bid; and (6) a "maximum spend" over some time period.

Figure 8:
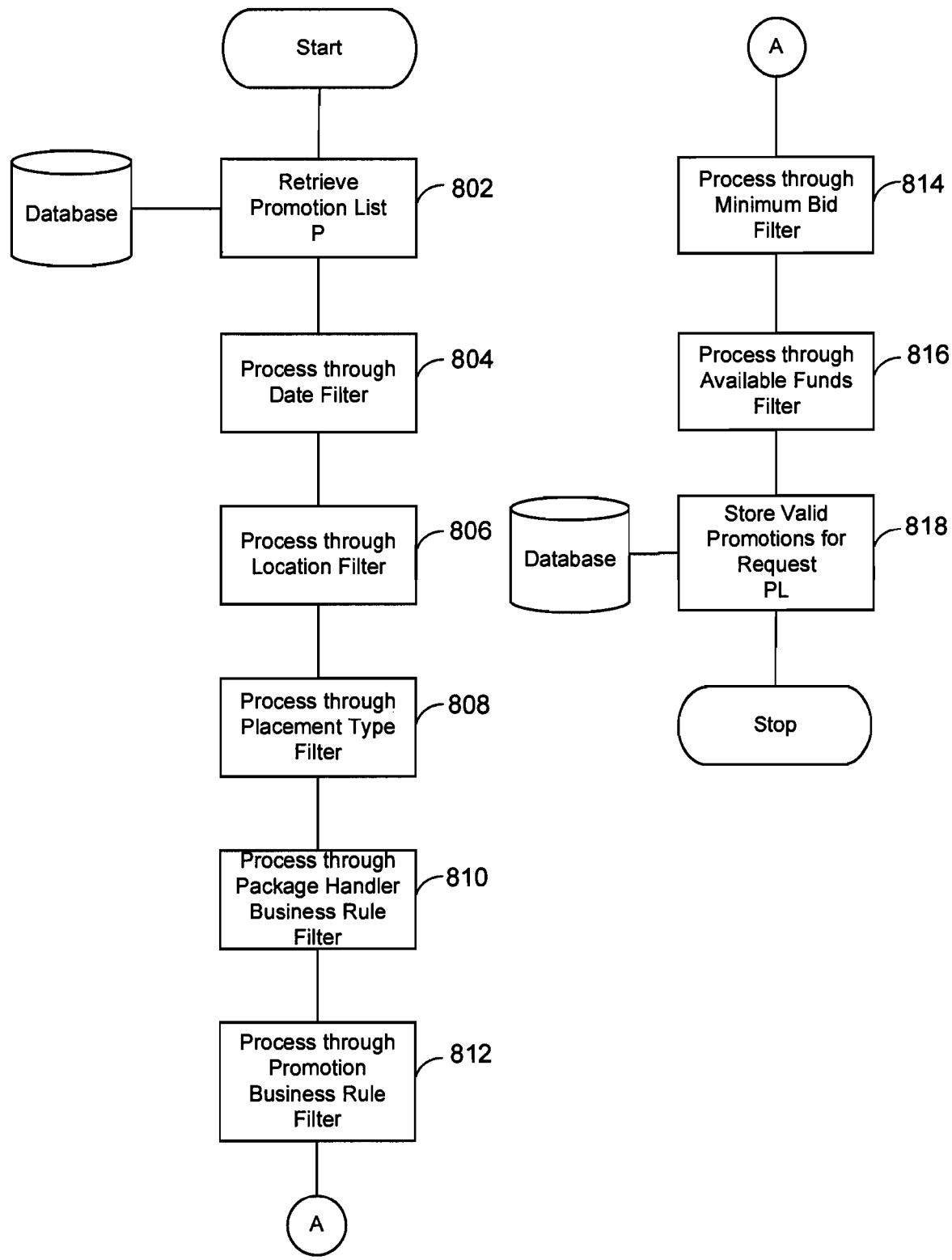
FIG. 8 illustrates a process flow diagram of a parcel targeted advertising method, in accordance with one preferred embodiment, to determine advertisements for a valid request.

Referring again to FIG. 6, the system identifies a set of valid promotions (VPs) for the promotional request by passing the complete set of advertisements and/or promotions through a series of rule filters, Step 604. With reference to FIG. 8, a process flow diagram illustrates a method for determining advertisements and/or promotions for a valid request. At Step 802, the advertisement and/or promotion list is retrieved. Each rule filter takes as input a set of advertisements and/or promotions and outputs a subset of advertisements and/or promotions that are valid for the specific rule. The output from one rule filter is used as input into the next rule filter in the series. In one embodiment, rule filters can be processed in any order. By way of example, and not by way of limitation, a sample series of rule filters follows:

1. Date Filter: Select promotions that are valid for the date specified in the promotional request, Step 804.
2. Location Filter: Select promotions that are valid for the postal code specified in the promotional request, Step 806.
3. Placement Type Filter: Select promotions that are valid for the types of placements for the promotional request (e.g., black and white versus color, size, and the like), Step 808.
4. Package Handler Business Rule Filter: Select promotions that are acceptable to the package handler, Step 810. The system maintains a black lists and white lists for each package handler:
   a. Black lists:
      i) The package handler does not accept promotions from specific promotional partners or the clients of specific promotional partners.
      ii) The package handler does not accept promotions that contain specific content. For example, the package handler does not accept promotions that are adult in nature.

b. White list:
   i) The package handler only accepts promotions from specific advertisers or clients of advertisers.
   ii) The package handler only accepts promotions that contain specific content. For example, the package handler only accepts promotions that contain Christian content.
5. Promotion Business Rule Filter: Promotions that are acceptable to the promotional partner are selected, Step 812. The system maintains black lists and white lists for each promotional partner:
   a. Black list:
      i) The promotional partner does not place promotions with specific package handlers.
      ii) The promotional partner does not place promotions on packages that contain specific items. For example, Huggies® does not advertise on packages that contain Pampers®.
   b. White list:
      i) The promotional partner only places promotions with specific package handlers.
      ii) The promotional partner only places promotions on packages that contain specific items. For example, Gerber® only places promotions on packages that contain Pampers®.
6. Minimum Bid Filter: Select promotions whose bid value is greater than a minimum, Step 814.
7. Available Funds Filter: Select promotions from advertisers that have available funds in an escrow account for the system in the event that the promotion is selected, Step 816. Otherwise stated, this rule ensures that each advertisement and/or promotion selected in this phase can cover its associated bid costs by confirming that there are available funds in escrow.

As described above, before the advertisement and/or promotion is dispensed onto the parcel, the parcel targeted-advertising system 10 implements a business rule to determine (or certify) the cost effectiveness of dispensing the advertisement and/or promotion. Specifically, once the advertising and/or promotion has been generated, the parcel targeted-advertising system 10 looks at the total revenue that the particular advertising and/or promotion represents (i.e. the sum total cost of the individual advertisement and/or promotion placements). If the total revenue is below some threshold, the parcel targeted-advertising system 10 will not dispense the advertisement and/or promotion. The purpose of this rule is to enable one or more of the systems (e.g., either the core system 300, the package handler system 100, the advertiser/promoter system 200, and/or the third party system 400) to determine if the advertisement and/or promotion is economically viable. Otherwise stated, this rule determines whether the revenue generated from the dispensing of the advertisement and/or promotion justifies the costs associated with the dispensing of the advertisement and/or promotion (e.g., labor, printing, paper, and the like).

After all the rules are processed, the system produces a list of zero or more promotions that satisfy the conditions of the series of rule filters, and stores the list, Step 818.

By way of example, and not by way of limitation, a sample description of processing a promotional request using the rule filters is as follows:
1. A promotional request is received by the system.
2. The promotional request contains the following information:
   a. Postal code—90034 USA
   b. Religion—Buddhist
   c. Names—James Barthlow
   d. Placement Type—Color, 4"×6"
   e. Minimum bid—U.S. $1.50
   f. Date—Jan. 28, 2006
3. At the time of the request, the system has 1,504,349 promotions stored in the promotional database system.
4. Of the 1,504,349 promotions, only 61,383 are valid for placement on Feb. 28, 2006.
5. Of the 61,383 promotions, only 4,304 are valid for the postal code 90034 USA.
6. Of the 4,304 promotions, only 1,321 are valid for the placement type (e.g., color printing on a label 4"×6").
7. Of the 1,321 promotions, 15 are invalid because the package handler does not accept promotions from the promotional partners.
8. Of the 1,306 promotions, 275 are invalid because the promotional partner does not place promotions on packages handled by the package handler.
9. Of the 1,081 promotions, only 543 are valid because their bids are equal to or greater than U.S. $1.50.
10. Of the 543 promotions, only 432 are valid because the maximum spend limit of the promotion over the maximum spend's time frame is greater than the auction bid cost for the promotion. As previously described, the maximum spend rule ensures that each advertisement and/or promotion selected can cover its associated bid costs by confirming that there are available funds in escrow.
11. 432 promotions are available to satisfy the promotional request.

Figure 9A:
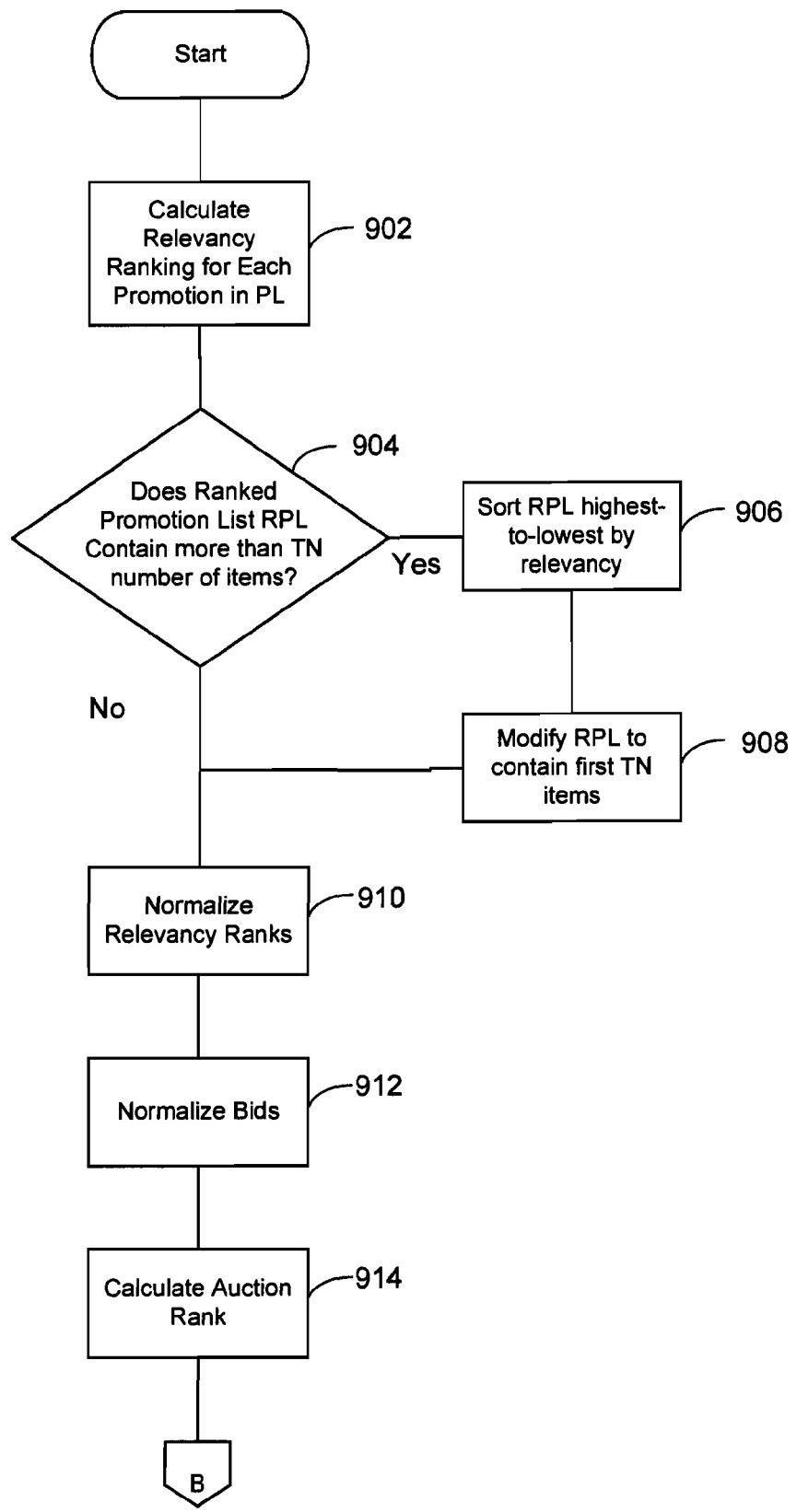
FIG. 9A illustrates a process flow diagram of a parcel targeted advertising method, in accordance with one preferred embodiment.
Figure 9B:
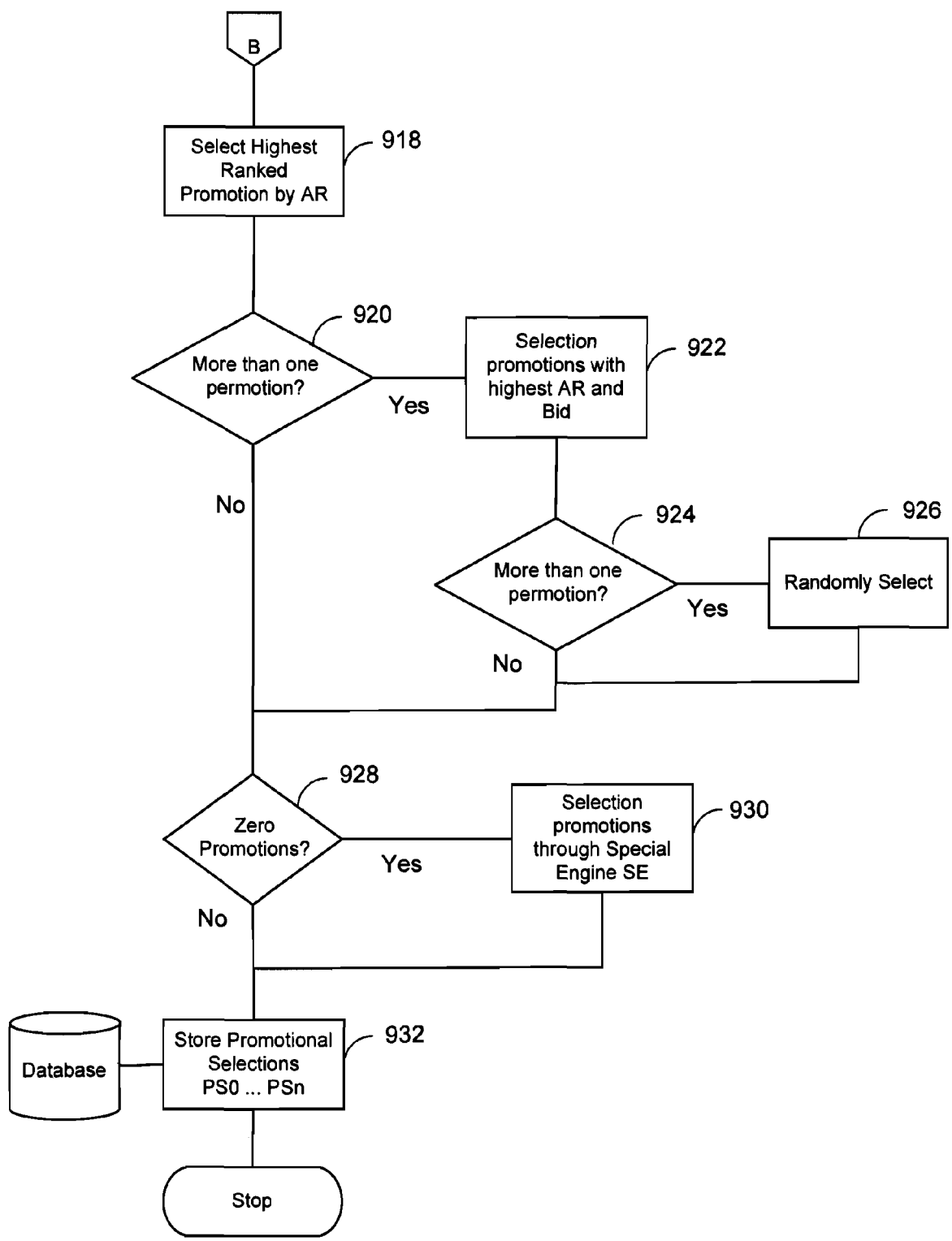
FIG. 9B illustrates a process flow diagram of a parcel targeted advertising method, in accordance with one preferred embodiment.

Advertisement and/or Promotional Selection:

Referring now to FIG. 6, at this stage of the process, the advertisements and/or promotions are selected by the system, Step 606. With reference to FIGS. 9A-9B, a process flow diagram illustrates a method for advertising and/or promotional selection. The advertising and/or promotional selection engine analyzes package characteristics and promotions list to determine which advertisements and/or promotions to place that satisfy the request. For each promotional placement, this analysis involves two steps: (1) relevancy ranking and (2) auction.

Relevancy Ranking:

Relevancy ranking is the process of ranking each advertisement and/or promotion in the promotions list according to its relevancy to the characteristics of the package. In one embodiment, at Step 902, an advertisement and/or promotion's relevancy is calculated as follows. For each promotion in the promotions list, select those nodes in package characteristics that exist in the nodes PNODES defined for the promotion. The resultant list contains valid nodes for the advertisement and/or promotion.

$$PNL = \{N_0, N_1, \ldots, N_n\}$$

where PNL=resultant list; and N=node

Each node in resultant list contains a nodal weighting factor. The advertisement and/or promotion's relevance is a weighted sum of each NW in resultant list.

$$PR = RW_0 * NW_0 + RW_1 * NW_1 + \ldots + RW_n * NW_n$$

where PR=promotional request; RW=Weighted Sum; and NW=nodal weighting factor

The result of the relevancy ranking process is a ranked list of promotions in which each advertisement and/or promotion has a relevancy score.

If the ranked promotions list contains greater than a threshold number of advertisement and/or promotions (Step 904), the list is sorted highest-to-lowest by promotional request, (Step 906), and the ranked promotions list is modified to contain only the first threshold number elements, (Step 908).

The ranked list of advertisement and/or promotions is passed to an auction engine.

Auction

The input into the auction is a ranked list of advertisement and/or promotions. At Step 910, the auction computes the normalized promotion rank of each element in the ranked promotions list by dividing each promotional request by the highest value promotional request in the list Promotional RequestMAX.

$$NPRn=PRn/PRMAX$$

where NPR=normalized promotion rank

At Step 912, the auction computes a normalized bid price of each element of the ranked promotions list by dividing each bid price by the highest value bid price in the list BPMAX.

$$NBPn=BPn/BPMAX$$

where NBP=normalized bid price; and BP=normalized bid price

At Step 914, the auction then computes the auction rank for each element in the ranked promotions list by multiplying the normalized promotion rank and normalized bid price values.

$$ARn=NPRn*NBPn$$

where AR=auction rank; NPR=normalized promotion rank; and NBP=normalized bid price The ranked promotions list is sorted highest-to-lowest by auction rank. Referring now to FIG. 9B, which is a continuation of the flow diagram of FIG. 9A, the promotion with the highest auction rank is selected as the winner of the auction, Step 918.

At Step 920, the system checks for a situation where more than one advertisement and/or promotion is ranked the highest. Next, the auction selects the advertisement and/or promotion with the highest bid price, Step 922. At Step 924, if there is more than one advertisement and/or promotion with the highest bid price and auction rank, the auction selects a winner by randomly selecting from the list of advertisement and/or promotions with the highest bid price and auction rank, Step 926. The winner's advertisement and/or promotion is then selected to be stored, Step 932.

Zero Advertisement and/or Promotions Available

In a preferred embodiment of the parcel targeted-advertising system 10, the system 300 (FIG. 3) checks for whether zero advertisements and/or promotions were selected, Step 928. In one preferred embodiment, in the event that the resultant promotion list from the promotion selection engine or auction contains zero promotions, the system processes the promotional request through a special engine, Step 930. The SE is designed to place a special advertisement and/or promotional item, such as a public service announcement, or corporate identity promotion. Public service announcement and corporate identity promotion advertisements and/or promotions are defined as normal promotions with an additional characteristic; i.e., that they are designated for exclusive use by the special engine.

In one embodiment of the parcel targeted-advertising system 10, the special engine selects all advertisements and/or promotions that are designated for its use and processes the selections through the series of rule filters described in the above. The rule filters processing produces a ranked set of advertisements and/or promotions for special placement, which is passed to the advertising and/or promotional selection process. In the event of zero promotions, a default system advertisement and/or promotion is selected.

Advertisement and/or Promotional Placement:

Referring again to FIG. 6, in a preferred embodiment of the parcel targeted-advertising system 10, the system responds to the promotional request with the advertisements and/or promotions to be placed, Step 608. The advertising and/or promotional response contains one or more advertisements and/or promotions in the form that is appropriate for the type of advertising and/or promotional placement (e.g., color image, black and white image, text, and the like). The advertising and/or promotional response is transmitted to the package handler over an appropriate communication network in a form appropriate for the receiving device and/or application. By way of example, and not by way of limitation, appropriate forms include:

1. HTML response to a HTML GET request;
2. XML/SOAP response to a web service;
3. Facsimile; and
4. Postscript, PCL, or other printing protocol over an electronic communications network.

In a preferred embodiment of the parcel targeted-advertising system 10, the advertisement and/or promotional handler outputs the advertisements and/or promotions on the advertisement and/or promotion output device 102 and places the label 325 on the package 320.

In another preferred embodiment, the parcel targeted-advertising system 10 can be used to provide free or subsidized shipping of packages or mail through advertising. For example, in one embodiment, package handlers, such as FedEx® or UPS®, can offer a discount to patrons who are willing to allow targeted advertising to appear on their packages as selected by the system described above.

In another embodiment, a fulfillment agency for television, catalog, or Internet sales companies is able to reduce their shipping costs by allowing package handlers to provide targeted advertising on packages containing purchased products. The fulfillment agency can either take the savings as profits, or pass the savings to the television, catalog or Internet sales companies. In one embodiment, all of the costs associated with shipping are covered by placing the targeted advertising promotions on the packages. Savings can be passed to the consumers from the television, catalog, or Internet sales company to stay competitive in the marketplace.

In these and other embodiments, the promoters subsidize postage for the packages that allow the shipping costs savings by requesting targeted promotional labels for placement on packages to be delivered to the recipients of purchased products, or the like. In one embodiment, a method provides the subsidies for the costs savings, wherein each package has one or more characteristics, and the recipient of the package has location characteristics. The plurality of promotional requests are received the promoters, wherein each promotional request has one or more promotional characteristic. For each promotional request, one of the promotional characteristics includes a bid price offered to place a promotion on the package. The promotional characteristics, the package characteristics, and location characteristics are analyzed to determine a relevancy ranking for the promotional requests, wherein at least one of the promotional requests has a highest ranking. For each of the at least one highest ranked promotional requests, the promotion for which the bid price that is offered is placed on the package for delivery. The shipping costs are recovered for the package by receiving the bid price offered for each of the at least one highest ranked promotional request for which a promotion is placed on the package.

The various embodiments described above are provided by way of illustration only and should not be construed to limit the invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A method for providing a targeted advertisement system, wherein the advertisement is directed towards a specific individual recipient to whom the package is being delivered, the method comprising:
   receiving advertisement information at a core computer system of a targeted advertisement system from third party advertisers, the advertisement information including advertisement subcomponents that are desired to be placed;
   associating the advertisement subcomponents from third party advertisers with advertisement selection criteria, the advertisement selection criteria including valid postal codes for the advertisement, valid dates for the advertisement, or valid placement types for the advertisement;
   receiving a request for a package to be delivered to the recipient;
   calculating package characteristics that are each represented by a node, wherein each node is an object with a unique weight;
   determining characteristics of a specific recipient, wherein the specific recipient has a plurality of characteristics including at least a plurality of: gender status, martial status, age, religious affiliations, occupation, language, education, socio-economic status, employment, income, mobility, home ownership, debts, ethnicity, life cycles, nationality, or family size, each of which are represented by a node, wherein each node is an object with a unique weight;
   analyzing the advertisement selection criteria associated with an advertisement from third party advertisers in conjunction with analyzing the characteristics, and its specific recipient by the core computer system;
   generating characteristic filters from a list of nodes representing characteristics with specific values for each node, and multiplying a weighted sum across all the characteristic filters;
   creating a unique advertisement from advertisement subcomponents from third party advertisers for the package by the core computer system using the weighted sum of the characteristic filters; and
   placing the unique advertisement on the package for delivery; and
   receiving compensation at the targeted advertisement system from the advertiser for the placement of the unique advertisement on the package.

2. The method of claim 1, wherein each object is a node that contains a nodal weight; a list of keywords, each having a unique weight; and a list of related nodes, each having a unique weight.

3. The method of claim 1, wherein the package characteristics include package delivery date.

4. The method of claim 1, wherein the package characteristics include package delivery date in conjunction with closest holiday date.

5. The method of claim 1, wherein the package characteristic, recipient characteristic, or combination thereof that is implicitly deduced from explicitly provided information, includes weather at recipient location and package delivery date.

6. The method of claim 1, wherein the package-handler characteristics comprise the manufacturer of the package content.

7. The method of claim 1, wherein the package handler characteristics comprise a nature of a transaction that resulted in shipment of the package.

8. The method of claim 1, wherein two or more recipient characteristics are used in the selection of the advertisement.

9. The method of claim 1, wherein three or more recipient characteristics are used in the selection of the advertisement.

10. The method of claim 1, wherein four or more recipient characteristics are used in the selection of the advertisement.

11. A method for providing a targeted advertisement system, wherein the advertisement is specifically directed towards a specific recipient to whom the package is being delivered, the method comprising:
    receiving advertisement information from third party advertisers at a core computer system of the targeted advertisement system, the advertisement information including advertisement subcomponents that are desired to be placed;
    analyzing advertisement selection criteria associated with the advertisement from third party advertisers in conjunction with analyzing package characteristics and characteristics of its specific recipient;
    calculating package characteristics are each represented by a node, wherein each node is an object with a unique weight;
    determining characteristics of a specific recipient, wherein the specific recipient has a plurality of characteristics including at least a plurality of gender status, martial status, age, religious affiliations, occupation, language, education, socio-economic status, employment, income, mobility, home ownership, debts, ethnicity, life cycles, nationality, or family size, each of which are represented by a node, wherein each node is an object with a unique weight;
    generating characteristic filters from a list of nodes representing characteristics with specific values for each node, and multiplying a weighted sum across all the characteristic filters;
    creating a unique advertisement from advertisement subcomponents from third party advertisers for the package by the core computer system using the weighted sum of the characteristic filters;
    placing the unique advertisement on the package for delivery; and
    receiving compensation at the targeted advertisement system from the advertiser for the placing of the unique advertisement on the package.

12. The method of claim 11, wherein each object is a node that contains a nodal weight; a list of keywords, each having a unique weight; and a list of related nodes, each having a unique weight.

13. The method of claim 11, wherein two or more recipient characteristics are used in the selection of the advertisement.

14. The method of claim 11, wherein three or more recipient characteristics are used in the selection of the advertisement.

15. The method of claim 11, wherein four or more recipient characteristics are used in the selection of the advertisement.

16. A system for generating a targeted advertisement, wherein the advertisement is directed towards a specific recipient to whom the package is being delivered, the system comprising:
    a computer and a computer usable medium having computer readable program code, wherein the computer useable medium stores computer readable code that enables the system to receive advertisement subcomponents from third party advertisers;

wherein the computer useable medium stores computer readable code that enables the system to analyze advertisement selection criteria associated with the advertisement from third party advertisers in conjunction with analyzing package characteristics and its specific recipient;

wherein the system calculates package characteristics that are each represented by a node, wherein each node is an object with a unique weight, and wherein the system determines characteristics of a specific recipient that has a plurality of characteristics including at least a plurality of: gender status, martial status, age, religious affiliations, occupation, language, education, socio-economic status, employment, income, mobility, home ownership, debts, ethnicity, life cycles, nationality, or family size, each of which are represented by a node, wherein each node is an object with a unique weight;

wherein the system generates characteristic filters from a list of nodes representing characteristics with specific values for each node, and multiplying a weighted sum across all the characteristic filters;

wherein the computer useable medium stores computer readable code that enables the creation of a unique advertisement from advertisement subcomponents from third party advertisers for the package using the weighted sum of the characteristic; and wherein the computer useable medium stores computer readable code that enables the system to receive compensation from the advertiser for the placing of the unique advertisement on the package.

17. The system of claim 16, further comprising: computer readable code configured to allocate the compensation from the advertiser to a seller of a product in the package, a buyer of a product in the package, a shipper of the package, or combinations thereof.

18. A method for providing a targeted advertisement system, wherein the advertisement is directed towards a specific recipient to whom the package is being delivered, the method comprising:

receiving advertisement information at a core computer system of a targeted advertisement system from third party advertisers, the advertisement information including advertisement subcomponents that are desired to be placed;

associating the advertisement subcomponents from third party advertisers with advertisement selection criteria, the advertisement selection criteria including valid postal codes for the advertisement, valid dates for the advertisement, or valid placement types for the advertisement;

receiving a request for a package to be delivered to the recipient;

calculating package characteristics that are each represented by a node, wherein each node is an object with a unique weight;

determining characteristics of a specific recipient, wherein the specific recipient has a plurality of characteristics including at least a plurality of: gender status, martial status, age, religious affiliations, occupation, language, education, socio-economic status, employment, income, mobility, home ownership, debts, ethnicity, life cycles, nationality, or family size, each of which are represented by a node, wherein each node is an object with a unique weight;

analyzing the advertisement selection criteria associated with an advertisement from third party advertisers in conjunction with analyzing the characteristics, and its specific recipient by the core computer system;

generating characteristic filters from a list of nodes representing characteristics with specific values for each node;

determining a relevancy ranking for the advertising subcomponents and creating a unique advertisement from the advertisement subcomponents from third party advertisers using a weighted sum of the characteristic filters;

placing a unique advertisement on the package for delivery to the recipient using at least the relevancy ranking; and receiving compensation at the targeted advertisement system from the advertiser for the placement of the unique advertisement on the package.

19. A method for providing a targeted advertisement, wherein the advertisement is directed towards a specific recipient to whom the package is being delivered, the method comprising:

receiving advertisement information from third party advertisers at a core computer system of a targeted advertisement system, the advertisement information including advertisement subcomponents that are desired to be placed;

associating the advertisement subcomponents from third party advertisers with advertisement selection criteria;

receiving a request for a package to be delivered to the recipient;

calculating package characteristics that are each represented by a node, wherein each node is an object with a unique weight;

determining characteristics of a specific recipient, wherein the specific recipient has a plurality of characteristics including at least a plurality of: gender status, martial status, age, religious affiliations, occupation, language, education, socio-economic status, employment, income, mobility, home ownership, debts, ethnicity, life cycles, nationality, or family size, each of which are represented by a node, wherein each node is an object with a unique weight;

analyzing the advertisement selection criteria associated with an advertisement from third party advertisers in conjunction with analyzing the characteristics, and its specific recipient by the core computer system;

generating characteristic filters from a list of nodes representing characteristics with specific values for each node, and multiplying a weighted sum across all the characteristic filters;

creating a unique advertisement from advertisement subcomponents from third party advertisers for the package using the weighted sum of the characteristic filters;

placing the unique advertisement on the package for delivery; and receiving compensation at the targeted advertisement system from the advertiser for the placement of the unique advertisement on the package.

\* \* \* \* \*

UNITED STATES PATENT AND TRADEMARK OFFICE
CERTIFICATE OF CORRECTION

| | |
|---|---|
| PATENT NO. | : 8,744,910 B2 |
| APPLICATION NO. | : 11/461622 |
| DATED | : June 3, 2014 |
| INVENTOR(S) | : James Chen-Haw Ho et al. |

It is certified that error appears in the above-identified patent and that said Letters Patent is hereby corrected as shown below:

In the Specification

Column 4, In line 41, add --S-- to "DRAWING"

Column 18, In line 51, insert --by-- after "received"

Column 18, In line 64, add --s-- to "request"

Signed and Sealed this
Fourteenth Day of October, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,744,910 B2  
APPLICATION NO. : 11/461622  
DATED : June 3, 2014  
INVENTOR(S) : James Chen-Hwa Ho and Todd Avery Outten Page 1 of 1

It is certified that error appears in the above-identified patent and that said Letters Patent is hereby corrected as shown below:

Title Page, Item (75) Inventors, replace "Haw" with --Hwa--

Signed and Sealed this
Twentieth Day of January, 2015

Michelle K. Lee
*Deputy Director of the United States Patent and Trademark Office*